Aug. 19, 1941.  C. L. HALL  2,252,925
DOUBLE SNAP FASTENER AND INSTALLATION OF THE SAME
Filed Aug. 19, 1939
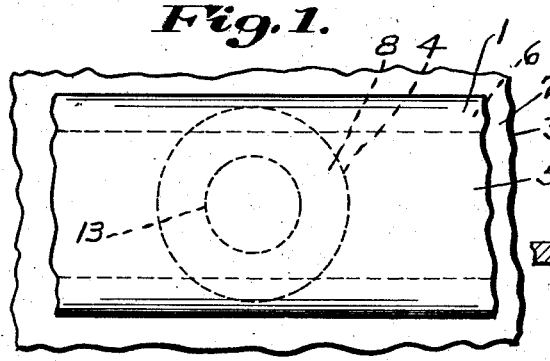
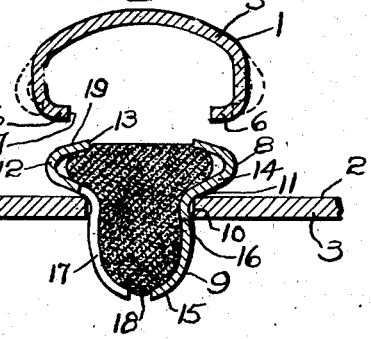
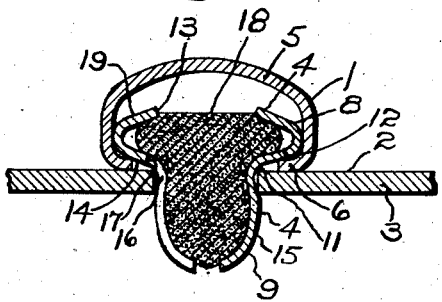
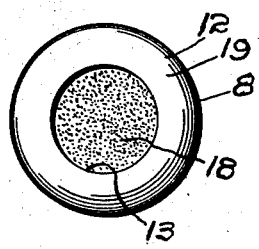
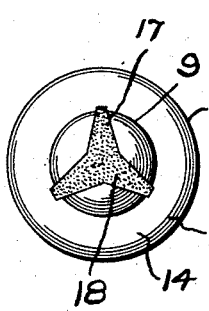
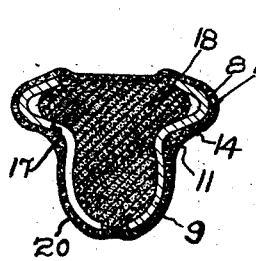
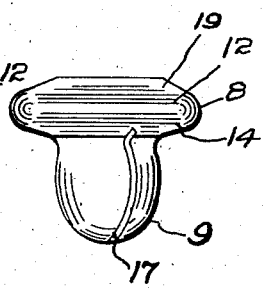
Inventor:
Charles L. Hall.
By John Todd
Att'y.

Patented Aug. 19, 1941

2,252,925

UNITED STATES PATENT OFFICE 2,252,925

DOUBLE SNAP FASTENER AND INSTALLATION OF THE SAME

Charles L. Hall, Detroit, Mich., assignor to United-Carr Fastener Corporation, Cambridge, Mass., a corporation of Massachusetts Application August 19, 1939, Serial No. 291,077

6 Claims. (Cl. 24—73)

This invention relates to improvements in double snap fasteners and installations of the same. The invention is directed to a fastener device of improved construction over that illustrated and described in connection with my copending application Serial No. 274,206, filed May 17, 1939.

One object of my invention is the provision of a double fastener member comprising a base shaped and arranged for fastener engagement with an apertured part such as a molding strip and a hollow slotted boss extending from the base for snap fastener engagement with a support through an opening thereof wherein means, such as rubber or the like, is applied to the fastener member in a way to seal the openings of the fastener to prevent the passage of foreign matter therethrough. The sealing means in one form of my invention comprises a plug-shaped insert of sponge rubber or the like disposed within the base and hollow boss of the fastener in a way to seal the openings. Another form of my invention includes a double fastener member having a coating of latex rubber or the like around its outer surfaces to cover the openings.

Other objects and uses of my invention will be apparent from inspection of the drawing and specification hereinbelow set forth.

Referring to the drawing in which I have illustrated preferred embodiments of my invention:

Fig. 1 is a top plan view of my preferred fastener installation showing a hollow molding strip secured to a support through means of my first form of improved fastener member;

Fig. 2 is a transverse sectional view of the installation shown in Fig. 1 and showing the molding strip in position to be snapped over the base of the fastener member;

Fig. 3 is a section similar to that of Fig. 2 with the parts in final assembly;

Fig. 4 is a top plan view of my first form of fastener member per se;

Fig. 5 is a bottom plan view of my first form of fastener member per se;

Fig. 6 is a side elevation of my first form of fastener member per se; and

Fig. 7 is a sectional view of a modified form of fastener member.

Referring to the drawing, I have shown a part to be supported such as a molding strip 1 secured to the outer surface 2 of a support 3 by means of my first form of fastener stud member 4. The molding strip 1 is of the type now commonly used to ornament the exteriors of automobiles and preferably provides a curved outer side 5 and inwardly extending flange portions 6—6 adjacent the opposite sides of an opening 7 running longitudinally of the strip. As a result of the relative thinness of the metal of the curved side 5, portions of the strip adjacent opposite sides of the opening 7 yield outwardly, as shown in dotted lines in Fig. 2, when the flanges 6—6 are engaged by the base of the fastener member and then spring back to engage securely the fastener base with the flanges 6—6 in a manner to be described. The fastener member 4 provides a base portion 8 disposed outside the surface 2 of the support 3 for cooperative fastener engagement with the molding 1 and a contractible and expansible head 9 pressed from the base 8 for snap fastener engagement with the support 3 through an opening 10 thereof so as to secure the fastener member in assembly with the support.

Referring in detail to my first form of fastener member 4, I have shown one made from a single piece of sheet metal and providing a hollow or cup-shaped base 8 at one end. The base 8, which is preferably circular in form, has a support-engaging portion 11 at its lower side and an annular circular wall 12 extending outwardly and upwardly from the support-engaging portion 11 and then inwardly to terminate adjacent an opening 13. The curved construction of the wall 12 provides an annular shoulder 14 on the lower side of the base which is spaced from the outer surface 2 of the support when the fastener member is assembled with the support. The stud portion 9 is in the form of a hollow boss which is pressed from the base 8 and extends from adjacent the support-engaging portion 11. The stud portion provides a stud head 15 and neck 16 and a plurality of slots 17 extend from the outer end of the head 15 in my preferred form through the neck 16 and into the base 8 so as to render the stud portion contractible and expansible for snap fastener engagement with the support 3 through the aperture 10. A plug 18 of flexible material such as sponge rubber is moved into the base 8 and boss 9 through the opening 13 and positioned in a way to fill up the opening 13 and at the same time overlie the slots 17 for their entire lengths. Thus the plug 18 serves to effect a sealing which prevents the passage of foreign matter such as dust, wind and water from the exterior of the automobile through the fastener member to the interior.

Assembly of my improved fastener member with the support 3 is carried out through snapping the stud portion 9 through the opening 10 to engage the support-engaging portion 11 of the base 8 with the support. As a result of the upwardly and outwardly extending formation of the wall 12 of the base, the annular shoulder 14 is spaced from the outer surface 2 of the support, as most clearly shown in Fig. 2. Next, the molding 1 is moved toward the base of the fastener so that the flanges 6—6 engage the inwardly extending portion 19 of the wall 12 of the base. As downward pressure is exerted upon the molding 1, the sides of the strip move away from each other as a result of the natural flexibility of the strip enabling the flanges 6—6 to be passed over the greatest diameter of the base portion, whereupon the sides of the strip spring back to normal position so as to position the flanges 6—6 in final attached position behind the shoulder 14. Thus the parts of my installation are firmly secured together.

As a result of my invention I have provided a double snap fastener adapted to be secured to a support in a way to present a fastener means such as the base 8 on one side of the support for fastener engagement with an apertured member to be secured to the support. At the same time I have provided means in the form of a rubber insert 18 capable of sealing the openings of the fastener to prevent the pasage of foreign matter through the fastener.

Referring to the second form of my invention illustrated in Fig. 7, I have shown a snap fastener which is identical to my preferred form illustrated in Figs. 1–6 but provides a supplemental sealing means in the form of a coating of liquid latex 20 completely covering the exposed outer surfaces of the fastener member and the openings 13 and 17. The coating 20 overlies the openings of the fastener to completely seal the same without effecting either proper expansion and contraction of the stud portion 9 or fastener engagement of the base 8 of the molding strip. At the same time the natural resiliency of the coating 19 cooperates with the walls of the opening 10 of the support to seal the opening when the stud portion 9 is snapped therethrough substantially in the manner illustrated and described in connection with my above-mentioned co-pending application.

Although I have illustrated and described preferred embodiments of my invention, I do not wish to be limited thereby because the scope of my invention is best defined by the following claims.

I claim:

1. A fastener member comprising a cup-shaped base at one end, said cup-shaped base being open at one end thereof, a hollow boss extending from said base providing a split stud head and neck for fastener engagement with a support through an aperture thereof and a plug of flexible material normally disposed within said hollow boss to seal the openings thereof.

2. A fastener member comprising a cup-shaped base at one end, said base being open at its upper end, a hollow boss extending from the lower end of said base providing a stud head and neck for snap fastener engagement with a support through an aperture thereof, said boss having at least one slot to permit contraction of said head, and means of flexible material normally overlying said slot to provide a part of the fastener and prevent the passage of foreign matter therethrough.

3. A fastener member comprising a hollow base open at its upper end, said base having an annular wall terminating adjacent said open end, said wall having a curved surface providing an annular shoulder for snap fastener engagement with another part through an opening thereof, a hollow boss extending from the lower end of said base providing a stud head and neck for fastener engagement with a support through an aperture thereof, said boss having at least one slot extending from said head into said base to permit contraction of said head, and a plug of flexible material disposed within said base and said boss and overlying said slot to prevent the passage of foreign matter therethrough.

4. A double fastener member comprising a hollow base portion for resilient fastener engagement with a member through an aperture thereof, and a stud head and neck extending from said base portion for snap fastener engagement with an apertured support, said stud member having at least one slot to permit contraction of said head, and a covering in the nature of latex rubber overlying portions of the outer surfaces of said fastener and said slot.

5. A fastener member comprising a hollow base open at its upper end, said base having an annular wall terminating adjacent said open end, said wall having a curved surface providing an annular shoulder for snap fastener engagement with another part through an opening thereof, a hollow boss extending from the lower end of said base providing a stud head and neck for fastener engagement with a support through an aperture thereof, said boss having at least one slot extending from said head into said base to permit contraction of said head, and a covering in the nature of latex rubber overlying portions of the outer surfaces of said fastener and said slot.

6. A fastener member comprising a hollow base open at its upper end, said base having an annular wall terminating adjacent said open end, said wall having a curved surface providing an annular shoulder for snap fastener engagement with another part through an opening thereof, a hollow boss extending from the lower end of said base providing a stud head and neck for fastener engagement with a support through an aperture thereof, said boss having at least one slot extending from said head into said base to permit contraction of said head, and a covering in the nature of latex rubber applied to the outer surfaces of said fastener and overlying the outer end of said base and said slot for the purpose described.

CHARLES L. HALL.